Figure 1:
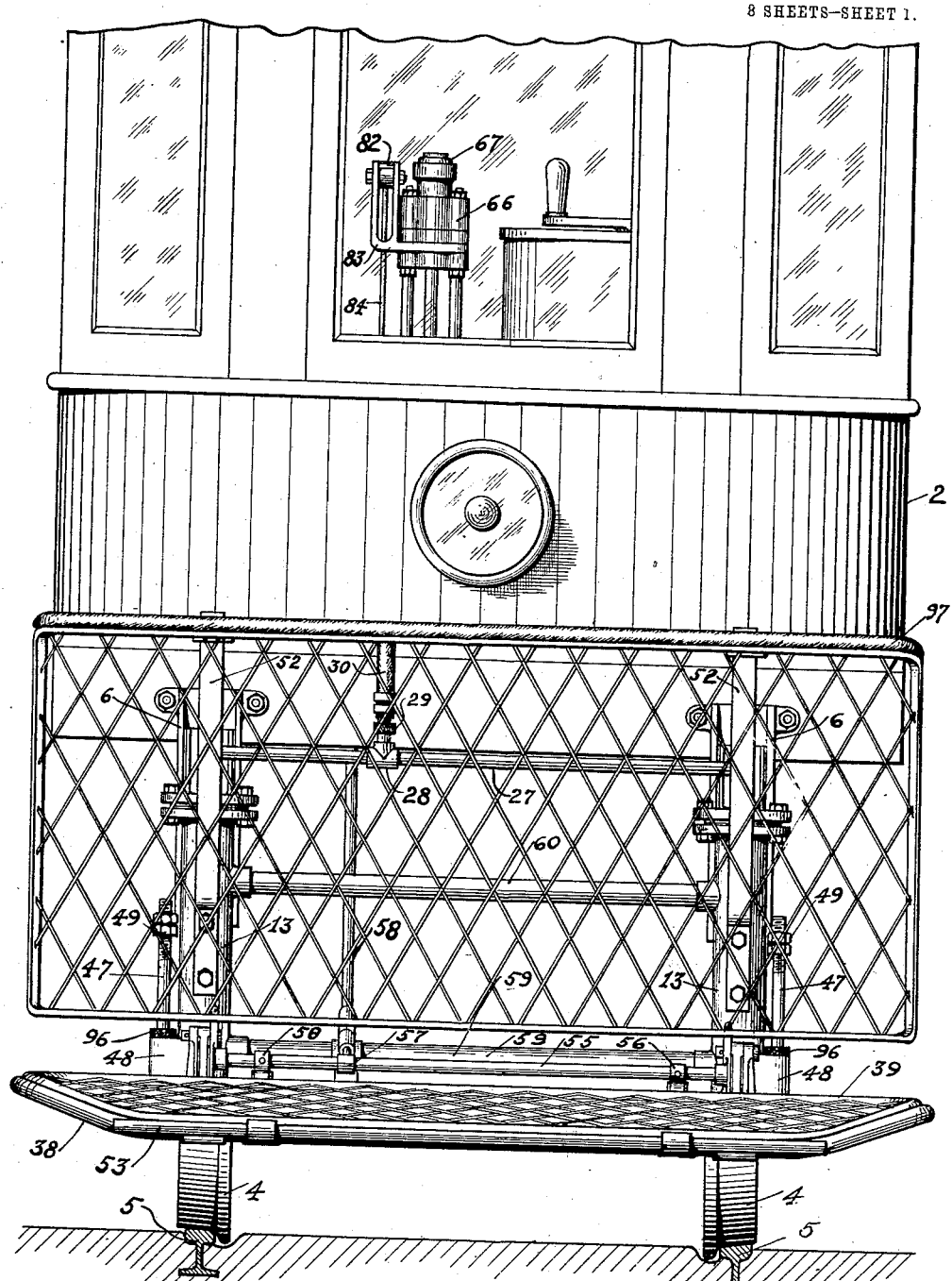

F. A. NELSON & H. E. GILHAM.
CAR FENDER.
APPLICATION FILED JUNE 19, 1911.

1,068,918.

Patented July 29, 1913.

8 SHEETS—SHEET 1.

WITNESSES
H. E. Sorensen
C. H. Rehfuss

INVENTORS
FRANK A. NELSON.
HARRY E. GILHAM.
BY Paul & Paul
ATTORNEYS

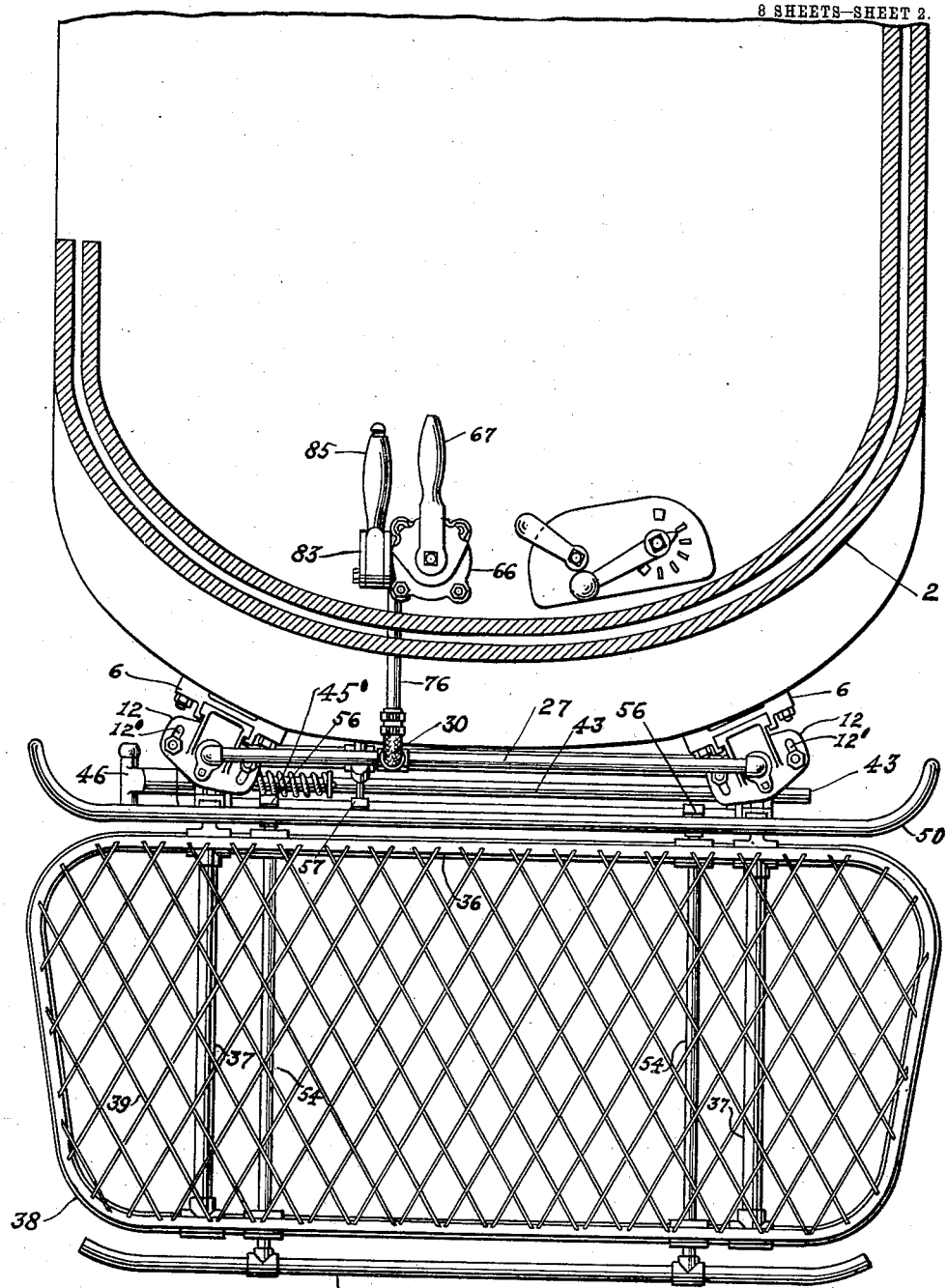

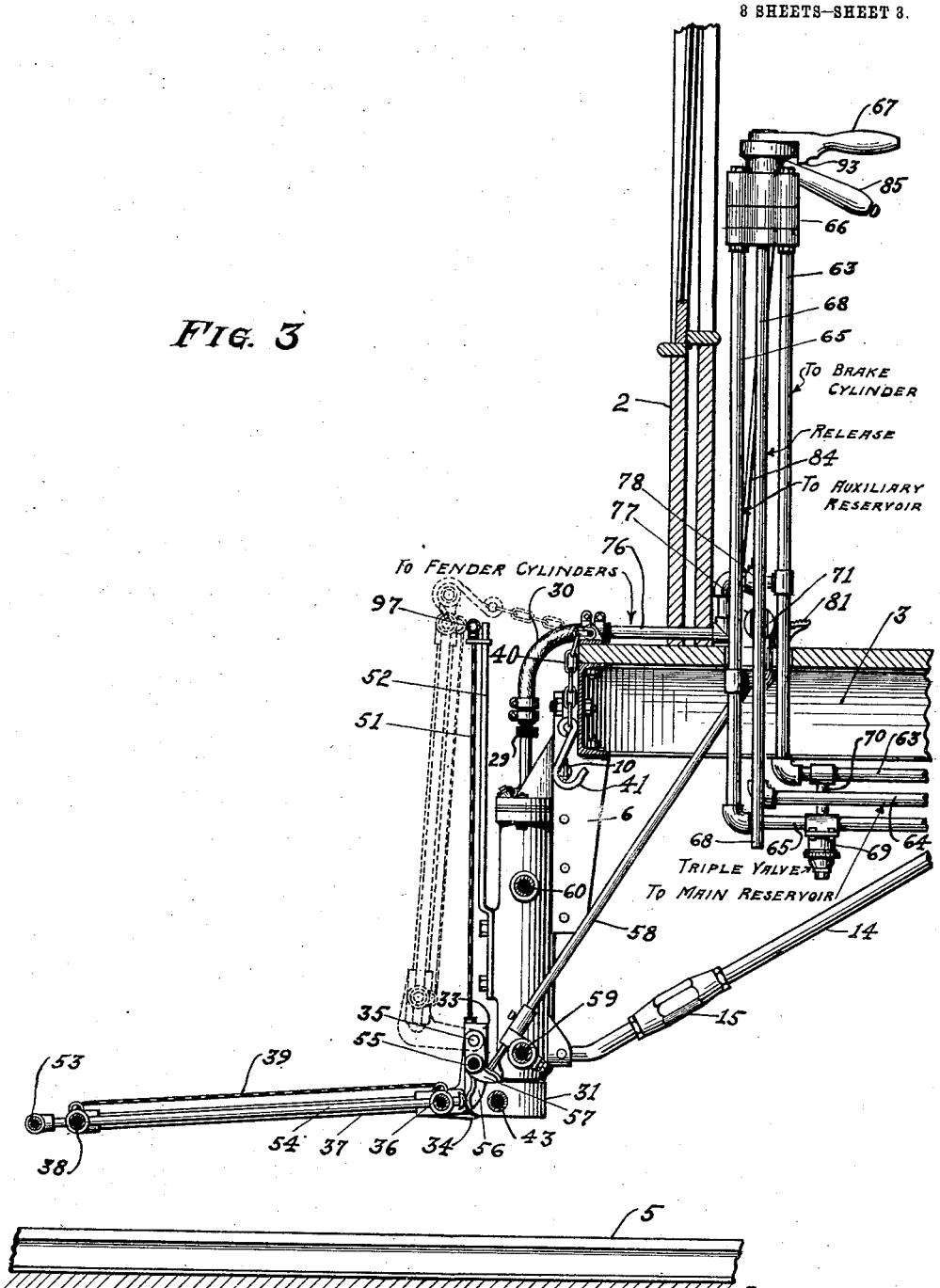

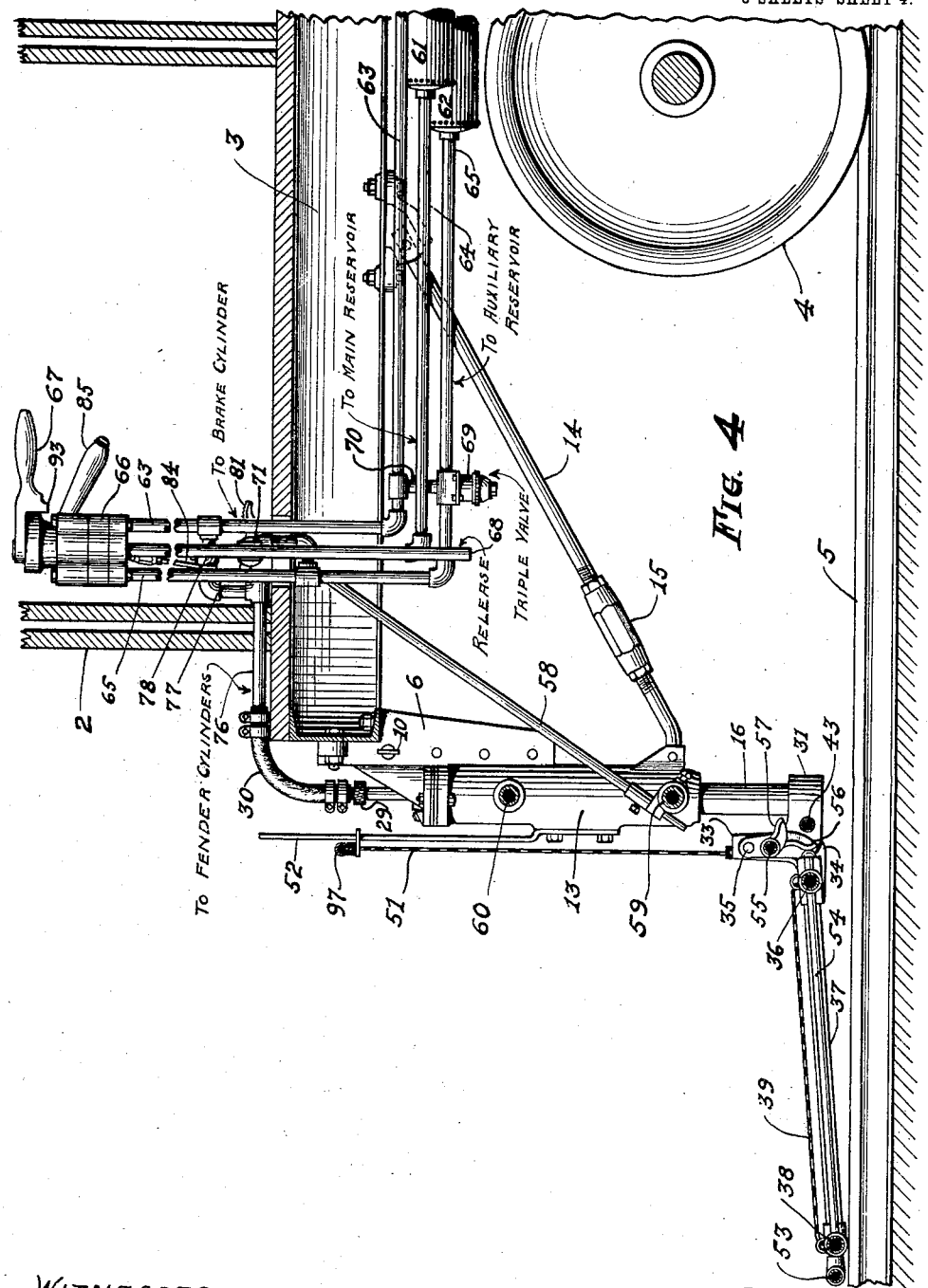

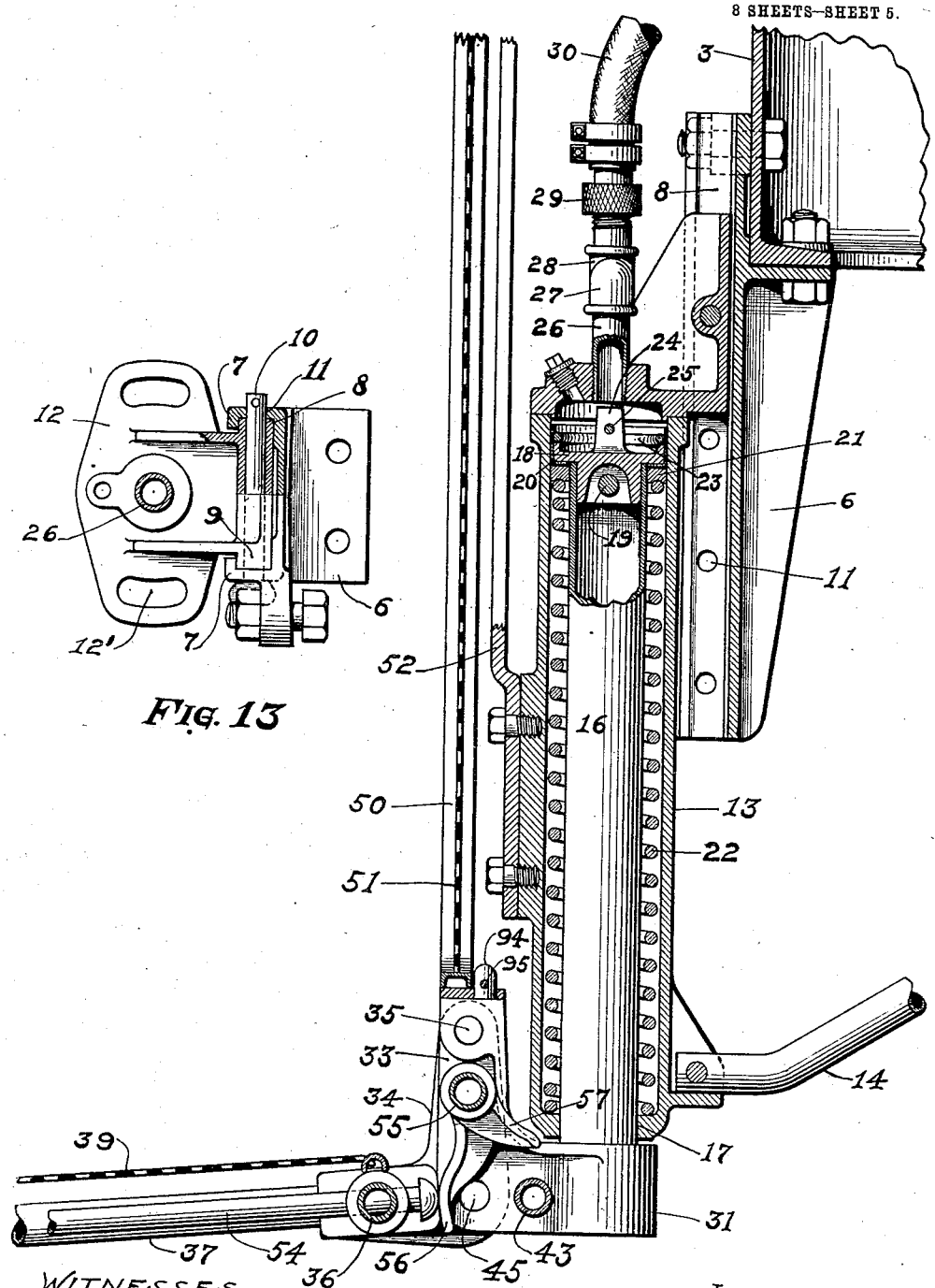

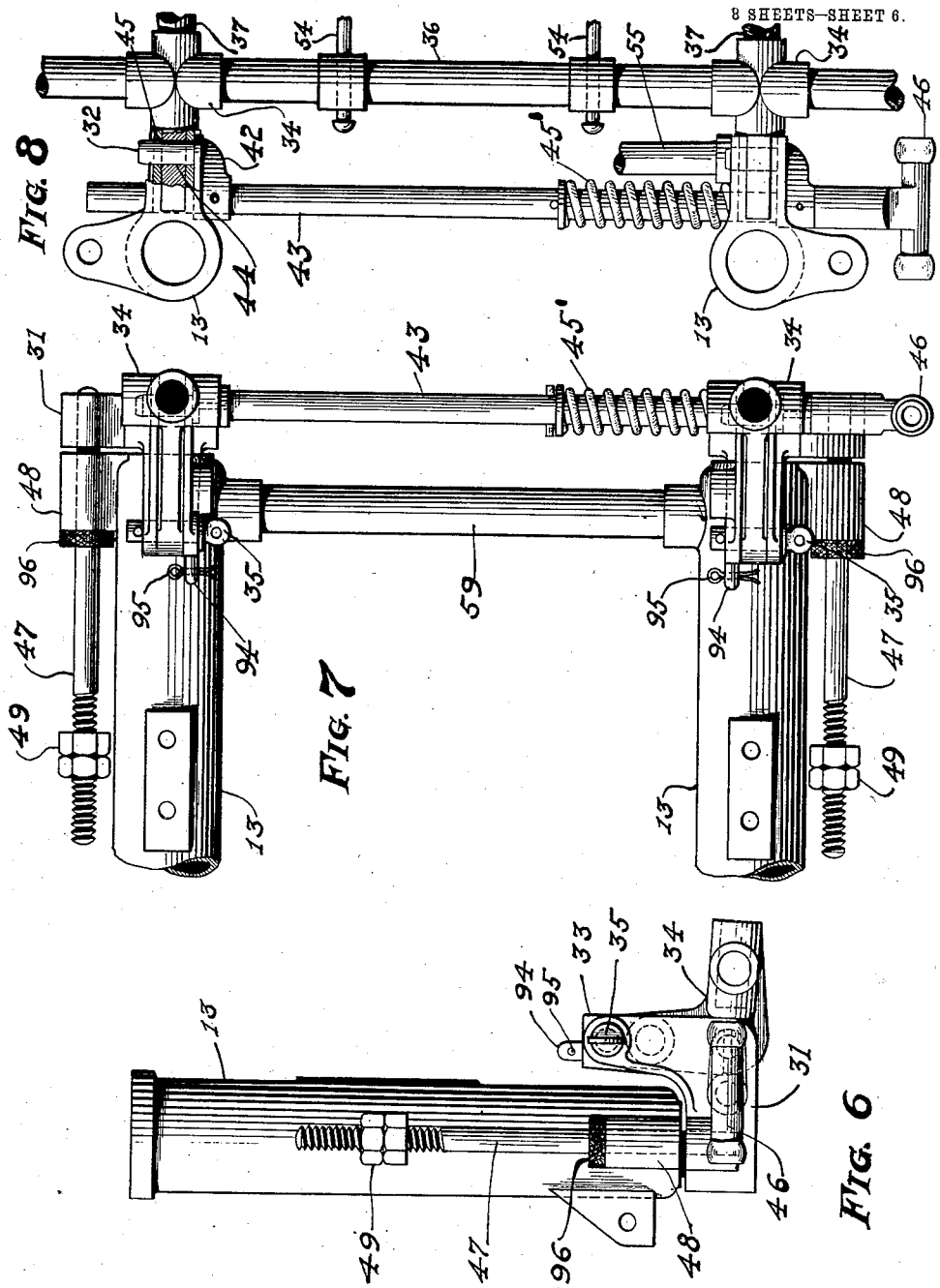

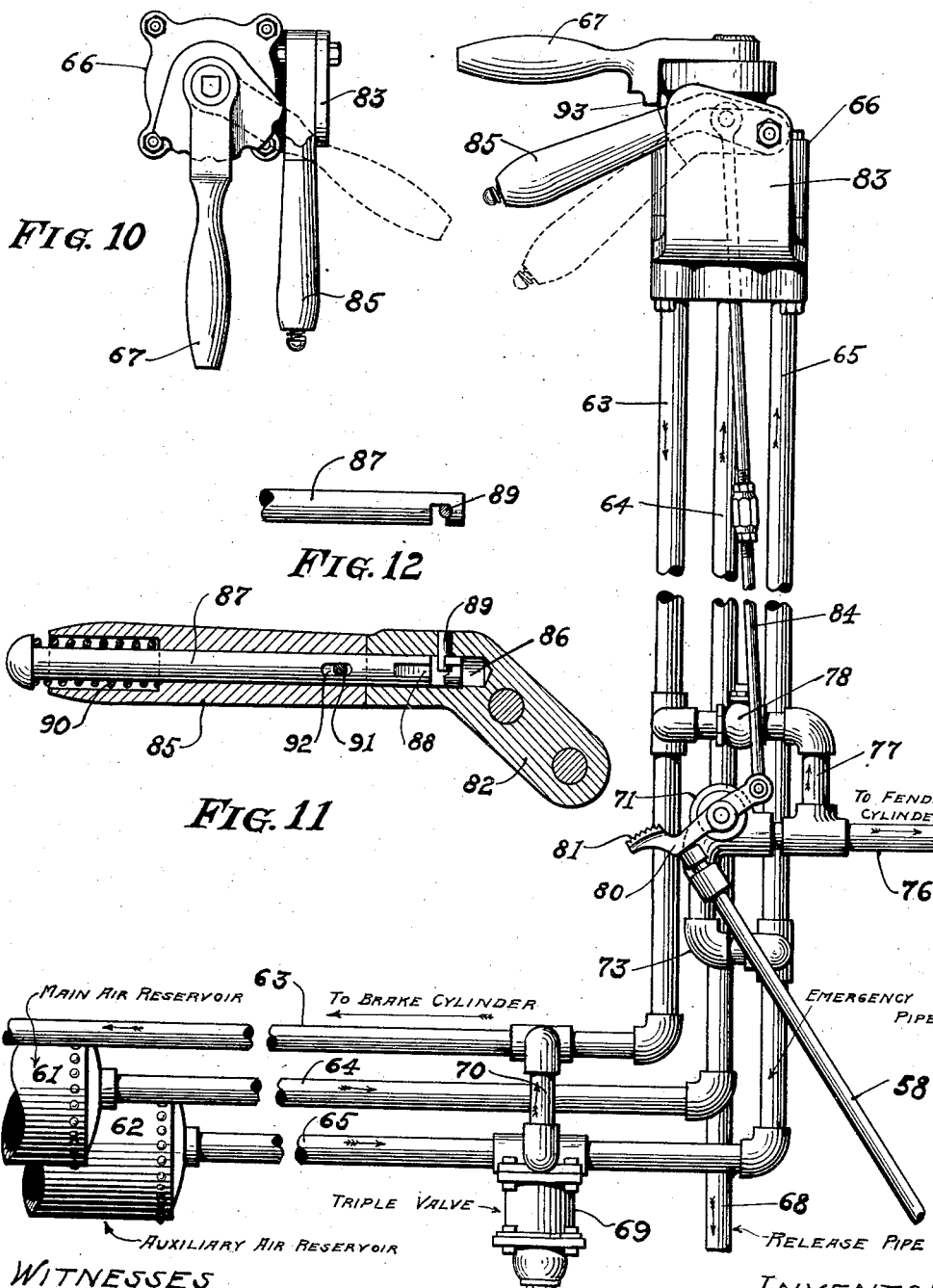

F. A. NELSON & H. E. GILHAM.
CAR FENDER.
APPLICATION FILED JUNE 19, 1911.
1,068,918.
Patented July 29, 1913.
8 SHEETS—SHEET 8.
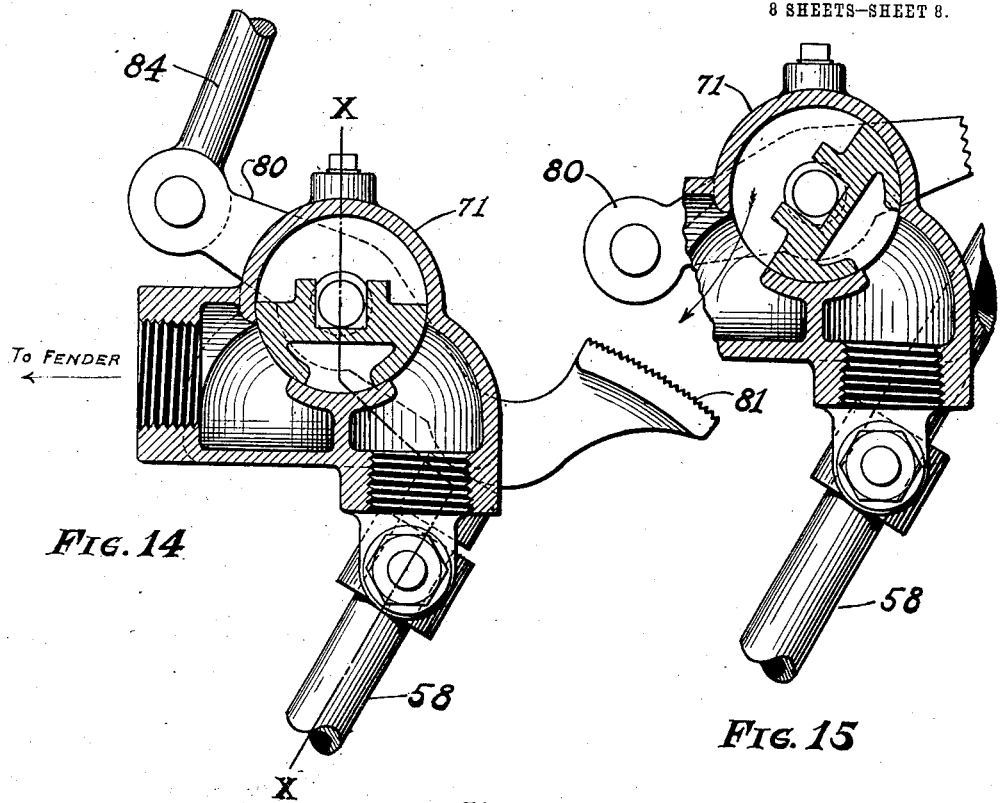
FIG. 14
FIG. 15
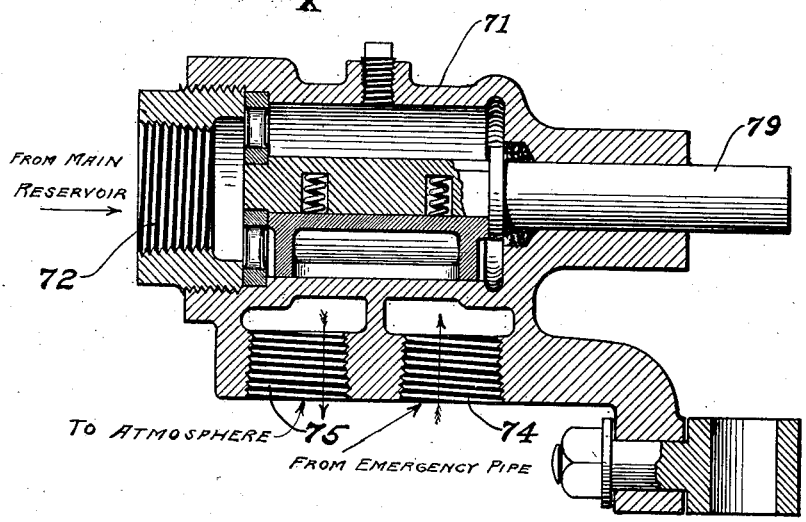
FIG. 16
WITNESSES
W. E. Sorensen
C. H. Rehfuss
INVENTORS.
FRANK A. NELSON.
HARRY E. GILHAM.
BY Paul Powel
ATTORNEYS.

UNITED STATES PATENT OFFICE.

FRANK A. NELSON, OF MINNEAPOLIS, MINNESOTA, AND HARRY E. GILHAM, OF SEATTLE, WASHINGTON, ASSIGNORS TO FRED H. LYSONS, TRUSTEE, OF SEATTLE, WASHINGTON.

CAR-FENDER.

1,068,918.  Specification of Letters Patent.  Patented July 29, 1913.

Application filed June 19, 1911. Serial No. 634,042.

*To all whom it may concern:*

Be it known that we, FRANK A. NELSON, of Minneapolis, Hennepin county, Minnesota, and HARRY E. GILHAM, of Seattle, King county, Washington, have invented certain new and useful Improvements in Car-Fenders, of which the following is a specification.

Our invention relates particularly to fenders for use on street cars and the primary object of our invention is to provide a fender and operating mechanism which can be easily and quickly attached to a car without changing the air controlling mechanism with which the car is already equipped.

A further object is to provide a fender capable of application to any height of car and to a car having a controlling mechanism at each end or at one end only.

A further object is to provide a fender mechanism capable of application to cars having an auxiliary air reservoir or those without such reservoir, and a fender that will be quick acting, strong and durable.

The invention consists generally in various constructions and combinations, all as hereinafter described and particularly pointed out in the claims.

In the accompanying drawings forming part of this specification, Figure 1 is an end elevation of a car, illustrating our invention applied thereto, Fig. 2 is a plan view, the vestibule of the car being shown in section, Fig. 3 is a side elevation of the fender mechanism, the forward portion of the car being shown in section, the fender being illustrated in its raised position, Fig. 4 is a similar view showing the fender in its lowered, or operative, position, Fig. 5 is a detail sectional view showing the mechanism for lowering and raising the fender, Fig. 6 is a side view of one of the cylinders, Fig. 7 is a front view showing the means for pivotally connecting the fender to the lower portion of the cylinder pistons, Fig. 8 is a detail plan view showing the device for locking the fender against its upward tilting movement, Fig. 9 is a detail view showing the mechanism for controlling the admission of fluid pressure to the fender cylinders and the brake cylinder, Fig. 10 is a detail view of the valve operating levers, Figs. 11 and 12 are detail views showing the manner of mounting the removable handle on one of the levers, Fig. 13 is a detail view showing the adjustable head of the cylinder and the means for supporting it for vertical adjustment on the front of the car, Figs. 14, 15 and 16 are detail sectional views of the valve which controls the admission of fluid pressure to the fender cylinders.

In the drawing, 2 represents a car having a truck frame 3 and wheels 4 resting upon the track rails 5. Bolted to the forward portion of the frame are hangers 6 having vertical flanges 7 forming guide-ways 8 in which brackets 9 are vertically slidable and are adjustably supported by pins 10 which pass through holes in said brackets and through corresponding holes 11 in the flanges 7. There are two of these hangers and brackets, one on each side of the center of the car and each bracket is mounted on a plate 12 which forms the head of a cylinder 13 vertically arranged and held in a vertical position with respect to the truck frame by pivoted braces 14 preferably provided with turn buckles 15 for endwise adjustment. To allow the convenient attachment of the cylinders to cars having different degrees of curvature in the walls of the vestibule, we prefer to provide slots 12' in the heads 12 to permit the rotary adjustment of the heads sufficiently to adapt them to the position and angle of the supporting hangers 6 of the car. Adjustment of the cylinders vertically on the hangers 6 adapts the device for attachment to cars having truck frames at different heights from the ground.

Within the cylinders we provide plungers or pistons which we prefer to construct in the following manner: 16 is a pipe adapted to slide in an opening 17 in the lower end of each cylinder and provided at its upper end with a flanged head 18 that is seated on the open upper end of the pipe 16 and secured therein by a pin 19. A ring 20 is fitted between the flanges of the head 18 and the walls of the cylinder and has inwardly turned lower edges forming a seat for a gasket 21. Between this gasket and the bottom of the cylinder a coiled spring 22 is provided. Above the head 18 is a ring 23 fitting within the end of the cylinder and closing the joint between the flanged head and the ring 20. The stud 24 is mounted on the head and a pin 25 passes through said stud and extends transversely of the cylinder, holding the ring 23 in place therein. The cylinder cap has a nipple 26 communicating with a branch pipe 27 leading to a T-shaped coupling 28. A union 29 connects this coupling with a flexible fluid pressure pipe 30. The lower ends of the piston pipes 16 have brackets 31 mounted thereon. These brackets have vertical standards 33 thereon arranged in pairs and spaced apart to receive the long arms of bell cranks 34 which have pivots 35 in said standards. The other arms of the bell cranks project forwardly from the brackets 31 and are connected across the fender by a brace pipe 36, or equivalent means to insure simultaneous movement of the pistons and brackets. Pipes 37 are mounted at the rear ends on the cranks 34 and project forwardly therefrom and support the fender frame 38, which is filled with the usual netting 39 of suitable mesh. This fender frame is capable of swinging with its supports 37 to the position indicated by dotted lines in Fig. 3, and is held in its raised position by a suitable locking means, such as the chain 40 provided with a hook 41. By removing pivots 35, fender frame 38 can be readily detached from car.

For the purpose of locking the fender in its horizontal position, we provide pins 32 mounted on hubs 42, which are secured to a shaft 43. Sockets 44 are provided in the bell cranks 34 adapted to register with similar sockets 45 in the standards 33. The shaft 43 is capable of longitudinal movement to allow the pins to be withdrawn from the sockets or inserted therein, and is also capable of rotary movement to move the pins when withdrawn to the point where they will be out of register with said socket. A spring 45′ normally holds the pins in their locking position and the shaft 43 is provided with a hand grip 46 by means of which the operator can withdraw the pins from their sockets, releasing the fender to allow it to be raised to its vertical, inoperative position.

The fender is preferably provided on each side with rods 47, slidable in guards 48 on the cylinders and having threaded ends provided with lock nuts 49 by the adjustment of which the downward stroke of the fender may be controlled, the movement of the fender being increased or decreased according to the adjustment of the lock nuts. Shock absorbing cushion rings 96 (Fig. 7) are concentrically mounted on rods 47.

On the top of the standards 33 and supported by studs 94, as provided by standards 33, a life guard consisting of a frame 50 and a suitable netting 51, is mounted, and adapted to slide on guides 52 carried by the cylinders. This guard is raised or lowered with the fender and adapts itself to the different positions assumed by the fender and prevents any object struck by the fender from being thrown back against the front of the car or the cylinders, and obviously, the netting of the guard will yield to a considerable extent and prevent injury to the person run down by the car. A cushion rail 97 is mounted on the top of the life guard. In case of demolishing life guard or coupling trailer to car, said life guard can be readily detached from car by removing cotterpins 95.

We prefer to provide in connection with this fender a means for automatically setting the brakes in case the fender strikes a person or obstruction on the track. This means consists preferably of a rail 53 supported on backwardly extending bars 54 which are slidable in the frame of the fender and have their rear ends projecting in the rear of the cross bar or rail 36. A shaft 55 is journaled in the arms of the bell crank 34 and is provided with cranks 56 which depend into the path of the bars 54. Upon this shaft 55 an arm 57 is mounted in position to engage and actuate a rod 58, and is slidable in a guide on a brace 59 which connects the lower ends of the cylinders 13. (See Fig. 3). A similar brace 60 connects the upper portions of the cylinders.

Referring now to Fig. 4 of the drawing, 61 represents the main fluid pressure reservoir, 62 the auxiliary reservoir, 63 the fluid pressure supply pipe leading to the brake cylinder, 64 the pipe leading from the reservoir, 61 and 65 the pipe leading from the auxiliary reservoir 62. The valve 66 controlling the fluid pressure corresponds to the one now in general use on cars and is equipped with the operating lever 67, also of ordinary construction. One or both ends of the car is usually equipped with this valve and the fluid pressure pipes leading therefrom to the reservoirs, the lever 67 being removable for use at either end of the car, as desired. This valve being of ordinary construction, we have not thought it necessary to illustrate it in detail herein. It is sufficient to say that the movement of the lever back and forth controls the flow of the fluid pressure from the reservoirs to the brake cylinder, not shown, and to the fender cylinders, as will hereinafter appear.

In addition to the pipes 63 and 65 communicating with the valve 66, there is an exhaust or release pipe 68 communicating with the atmosphere. We also provide a triple valve 69, of ordinary construction, or what is known as a three-way valve, communicating with the pipe 65 and also having a branch connection 70 with the pipe 63 leading to the brake cylinder. This mechanism last described is usually found on cars equipped with air brake systems, the three-way valve being for the purpose of providing a short cut for the fluid pressure from the auxiliary air reservoir to the brake cylinder pipe without passing it through the main controlling valve, and our invention is of such a nature that it can be applied to the controlling mechanism as generally used without any material changes or alterations.

With this end in view, referring to Fig. 9, we provide a valve 71 (for detailed construction see particularly Figs. 14, 15 and 16) having a connection at 72 (Fig. 16) with a pipe 64 from the main reservoir. A branch connection 73 leads from the emergency pressure pipe 65 and is connected to the valve 71 at 74 and said valve also has a connection at 75 with the exhaust leading to the atmosphere. A pipe 76 leads from the valve 71 to the union 29 and a branch pipe 77 leads from the pipe 76 to the air brake cylinder pipe 63 and is provided with a check valve 78, (see Fig. 9) which opens toward the left, allowing the brake cylinder and the fender cylinders to be opened to the exhaust by the movement of the valve lever 67 and preventing the fluid pressure from the brake cylinder from flowing through the pipe 77 to the fender cylinders, thereby allowing the brakes to be set without dropping the fender. The valve 71 is of the rotary type, as shown in Figs. 14, 15 and 16, and has a stem 79 on which a lever 80 is mounted. The end of this lever is provided with a treadle 81. The lever 80 projects into the path of the rod 58 and when the rod is moved lengthwise by the rocking of the shaft 55 and the engagement of the arm 57 with the lower end of said rod, the valve 71 will be rotated in its bearing to the position indicated in Fig. 15, allowing the fluid pressure to flow from the main reservoir pipe through the pipe 76 to the cylinders to force the fender downward to a position where it will pick up the person or object on the track and prevent it from being thrown backward under the wheels of the car. Evidently the operation of this rotary valve and the following depression of the fender will be performed automatically and instantly upon the engagement of the rail 53 with any object on the track which will offer sufficient obstruction to rotate the shaft 55 and actuate the rod 58. This rod 58 may be returned to its normal position when the object has been removed by the driver of the car placing his foot on the treadle portion 81 of the lever 80. When the fluid pressure has been admitted to the fender cylinders by the opening of the valve 71 when the rail 53 contacts with an object on the track, the air may also flow through the valve 78 to the brake cylinder pipe, the valve 78 opening toward the left, as heretofore described, while the controlling valve lever 67 will stand in its normal position, as shown in Fig. 10. When the operator desires to release the air in the fender cylinders, he may depress the lever 80, opening the valve 71 to the exhaust 75 and allowing the fender to be raised by its springs to its normal position, while the pressure will remain on the brake cylinder pipe until the controlling valve lever 67 is thrown to its released position. In this way the fender cylinders may be relieved of their pressure and the fender raised without releasing the brakes.

It is also desirable to provide in connection with this mechanism means for releasing the fender mechanically in case the object on the track is seen soon enough by the driver to do so. We therefore pivot a lever 82 on a plate 83 that is bolted to the valve 66. A rod 84 pivotally connects the lever 82 with the lever 80 and the lever 82 has a handle 85 which the driver may grasp to operate the lever 80, rotate the valve 71 and admit fluid pressure to the fender cylinders. Each end of the car being similarly equipped, we prefer to make the handle 85 removable, providing a socket 86 in the lever 82 and mounting a rod 87 in the handle 85, having a notched end 88 that is adapted to enter the socket 86 and engage a pin 89 therein. A spring 90 is mounted in the end of the handle and normally tends to withdraw the rod 87 from the socket 86, the pin 91 passing through the slot 92 in the rod 87 limiting the longitudinal movement of the rod 87. When the operator desires to detach the handle 85 from the lever 82 he will press in on the rod 87 and rotate it slightly until it is disengaged from the pin 89.

The dotted lines in Fig. 10 of the drawing shows the lever 67 set for emergency or at the point where the fluid pressure is admitted direct from the auxiliary reservoir through the branch pipe 70 to the brake cylinder pipe and in order that there may be simultaneous setting of the brake and operation of the fender, we prefer to use the lug 93, on the lever 67 in position to engage the lever 82 and force it downwardly to the position indicated by dotted lines in Fig. 9 when the lever 67 is thrown to the emergency position.

In the operation of the mechanism the fender being raised to the position shown in Fig. 3, the driver of the car may, by the movement of the valve 66, admit fluid pressure from the main reservoir 61 to the brake cylinder and stop the car without operating the fender and without admitting fluid pressure from the auxiliary reservoir to the brake cylinder. In case, however, the driver wishes to lower the fender suddenly, he will actuate the lever 82 by the movement of the lever 67, thereby allowing the fluid pressure between the valve 69 and the valve 66 to escape and causing the operation of the triple valve in the well-known way to direct the fluid pressure through the branch pipe 70 to the brake cylinder pipe. At the same time th elever 80 will be operated to open the valve 71 and allow the fluid pressure to flow to the fender cylinders and force the pistons and fender to the limit of their downward movement, lowering the fender to the position indicated on Fig. 4. At that point any object on the track will be gathered up and caught by the netting of the fender or the life guard. In case the fender strikes the object on the track before it is lowered, the valve 71 will be automatically opened to depress the fender and at the same time the pressure in the emergency pipe will be released to cause the operation of the three-way valve and direct the fluid pressure from the auxiliary reservoir to the brake cylinder. We thus provide means for mechanically controlling the movement of the fender where the driver of the car has ample opportunity to operate the mechanism and in case the object on the track is not discovered in time for manual operation of the fender and the setting of the brakes, the same result will be accomplished when the forward portion of the fender contacts with the object. When the fender cylinders are relieved of the air pressure, the springs therein put under compression by the downward movement of the plungers will return the plungers and the fender to their normal, elevated position. At any time the entire fender can be readily detached from the car by withdrawing the pins 10 from the hangers 6 on the front of the car, the pins in the brackets at the end of the brace 14 on the bottom of the car, and detaching the flexible hose section leading from the valve 71 to the fender cylinders.

We claim as our invention:

1. The combination, with a truck frame, of hangers secured thereon, fluid pressure cylinders vertically adjustable on said hangers, pistons for said cylinders, a fender carried by said pistons, and means for admitting fluid pressure to said cylinders to depress said pistons and fender.

2. The combination, with a truck frame, of hangers secured thereon and provided with vertical flanges, cylinders having brackets adapted to slide between said flanges, said flanges and brackets having holes adapted to register with one another, and pins fitting within said holes, pistons for said cylinders, a fender carried by said pistons, and means for admitting fluid pressure to said cylinders to depress said fender.

3. The combination, with a truck frame, of cylinders vertically mounted thereon, pistons for said cylinders, a fender carried by said pistons, a life guard also carried by said pistons and vertically arranged guides for said life guard, and means for admitting fluid pressure to said cylinders to depress said pistons and fender, said life guard sliding vertically on said guides in the movement of said fender.

4. The combination, with a truck frame, of fluid pressure cylinders mounted thereon, pistons for said cylinders, bell cranks having one of their arms pivoted on said pistons, the other arms of said bell cranks projecting forwardly from said pistons, a fender mounted on the forwardly projecting arms of said bell cranks and adapted to swing to a vertical position on the pivots of said bell cranks, and means for locking said bell cranks and fender in their lowered, operative position.

5. The combination, with a truck frame, of fluid pressure cylinders supported thereon, pistons for said cylinders, bell cranks having one of their arms pivotally supported by said pistons, the other arms of said bell cranks projecting forwardly from said pistons, a fender carried by said forwardly projecting rods, said fender being adapted to swing to a vertical position on the pivots of said bell cranks, said bell cranks and pistons having holes therein adapted to register with one another and locking pins fitting within said holes and normally securing said bell cranks and fender in their lowered, operative position.

6. The combination, with a truck frame, of cylinders supported thereon, pistons for said cylinders, brackets carried by the lower ends of said pistons and having forwardly projecting standards, bell cranks having one of their arms pivoted on said standards, the other arm of said bell cranks projecting forwardly from said brackets, a fender supported by said forwardly projecting arms and adapted to be swung to a vertical position on the pivots of said bell cranks, and means for locking said fender in its raised position.

7. The combination, with a truck frame, of main and auxiliary fluid pressure reservoirs mounted thereon, fluid pressure pipes therefor, a brake cylinder pipe, a three-way valve interposed in said auxiliary reservoir pipe and having a branch connection with said brake cylinder pipe, a controlling valve having ports communicating with said main and auxiliary reservoir pipes and with said brake cylinder pipe and having an exhaust opening, a fender carried by said truck frame, fluid pressure cylinders having their pistons connected with said fender, a fluid pressure supply pipe for said cylinders, and means actuated by the movement of said controlling valve to simultaneously admit fluid pressure to said cylinders and actuate said three-way valve to admit fluid pressure from said auxiliary reservoir pipe to said brake cylinder pipe.

8. The combination, with a truck frame, of cylinders supported thereon, pistons for said cylinders, a fender carried by said pistons, a rail projecting in front of said fender and having sliding supports therein, a rock shaft supported in the rear of said fender, a crank thereon in the path of said sliding supports, an arm mounted on said rock shaft, a sliding rod in the path of said arm, a fluid pressure cylinder having pipes communicating with said cylinders, and a controlling valve, said valve having a lever in the path of said rod to be actuated thereby to admit fluid pressure to said cylinders.

9. The combination, with a truck frame, of main and auxiliary fluid pressure cylinders mounted thereon, fluid pressure pipes therefor, a brake cylinder pipe, a three-way valve interposed in said auxiliary reservoir pipe and having a branch connection with said brake cylinder pipe, a controlling valve having ports communicating with said main and auxiliary reservoir pipes and with said brake cylinder pipe and also having an exhaust opening, an auxiliary valve communicating with said main reservoir pipe, a fender carried by said truck frame and adapted to be raised and lowered, fluid pressure cylinders having their pistons connected with said fender, a fluid pressure pipe leading from said auxiliary valve to said cylinders, a branch pipe having a check valve leading from said fluid pressure pipe to said brake cylinder pipe, and means for opening said auxiliary valve to simultaneously admit fluid pressure to said cylinders and actuate said three-way valve to admit fluid pressure from said auxiliary reservoir pipe to said brake cylinder pipe.

10. The combination, with a truck frame, of main and auxiliary fluid pressure reservoirs carried thereby, fluid pressure pipes for said reservoirs, a brake cylinder pipe, a controlling valve communicating with said pipes and having a suitable exhaust, a three-way valve interposed in said auxiliary reservoir pipe and having a branch connection with said brake cylinder pipe, an auxiliary valve having a pipe connection with said main reservoir pipe, a fluid pressure cylinder having a piston, a fender carried by said piston, means projecting in front of said plunger and actuated by the engagement of an object on the track, means operated by the movement of said projecting means for opening said auxiliary valve to admit fluid pressure to said fender cylinder, and a branch pipe having a check valve leading from said fender cylinder fluid pressure pipe to said brake cylinder pipe, whereby upon the opening of said auxiliary valve fluid pressure will be admitted to said fender cylinder and to said brake cylinder pipe simultaneously.

11. The combination, with a truck frame, of fluid pressure reservoirs mounted thereon, a controlling valve, pipes connecting said controlling valve with said fluid pressure reservoirs, a brake cylinder pipe, an operating lever for said valve, an auxiliary valve communicating with said fluid pressure pipes, a fender cylinder having a pipe connection with said auxiliary valve, a plunger for said cylinder, a fender carried by said plunger, said controlling lever being adapted to admit fluid pressure to said brake cylinder pipe, and a second lever in the path of said valve lever and actuated thereby to open said auxiliary valve when said controlling valve lever is thrown to a predetermined point.

12. The combination, with a truck frame, of a fluid pressure brake operating mechanism mounted thereon and including a controlling valve and an operating lever therefor, an auxiliary valve connected with said fluid pressure brake controlling mechanism, cylinders and pistons therefor and a pipe connection with said auxiliary valve, a fender operated by the movement of said pistons and a secondary lever in the path of said controlling valve lever and actuated thereby when said controlling valve lever is thrown to a predetermined point to open said auxiliary valve and operate said fender.

13. The combination, with a truck frame, of a fluid pressure controlling mechanism mounted thereon and including a controlling valve and an operating lever therefor, an auxiliary valve in connection with said controlling mechanism, a cylinder and piston therefor connected with said auxiliary valve, a fender operated by the movement of said piston, a secondary lever having means for attachment to said controlling valve and located in the path of said valve lever to be operated thereby, and means connecting said secondary lever with said auxiliary valve, whereby when said controlling valve lever is thrown to a predetermined point, said secondary lever will be moved to open said valve and admit fluid pressure to said cylinder.

14. The combination, with a truck frame, of hangers mounted thereon, vertically arranged cylinders and pistons therefor, said cylinders having heads capable of rotary adjustment thereon, brackets mounted on said heads and secured to said hangers, the rotary adjustment of said heads allowing said brackets to adapt themselves to the position of said hangers, a fender carried by said pistons, and a fluid pressure controlling mechanism connected with said cylinders.

15. The combination, with a truck frame, and a fluid pressure controlling mechanism mounted thereon, of cylinders suspended from said truck frame and vertically adjustable with respect thereto, a flexible fluid pressure connection between said cylinders and said fluid pressure controlling mechanism, said cylinders having pistons therein, and a fender carried by said pistons, said flexible connection allowing the vertical adjustment of said cylinders to adapt them to the different heights of truck frames.

16. The combination, with a truck frame and a fluid pressure controlling mechanism mounted thereon, of vertically movable fluid pressure cylinders, pistons for said cylinders, a fender carried by said pistons and means for admitting fluid pressure to said cylinders to depress said pistons and fender.

17. The combination, with a truck frame, of cylinders vertically supported thereon, pistons in said cylinders, a fender carried by said pistons, a fluid pressure controlling means connected with said cylinders, and means mounted on said pistons and slidably connected with said cylinders for limiting the downward movement of said fender.

18. The combination, with a truck frame, of cylinders supported thereon, pistons in said cylinders, a fender carried by said pistons, a fluid pressure controlling mechanism connected with said cylinder, rods mounted on said pistons and having lock nuts thereon, and guides carried by said cylinders and wherein said rods are slidable, the adjustment of said lock nuts on said rods regulating the downward movement of said fender.

19. The combination, with a truck frame, of a fluid pressure reservoir mounted thereon, a fluid pressure controlling valve having a pipe connection with said reservoir and provided with an exhaust, a brake cylinder pipe also communicating with said valve, an operating lever for said valve, an auxiliary valve communicating with said fluid pressure pipe, fluid pressure cylinders supported on said truck frame, pistons therefor, a fender arranged to be raised or lowered by the movement of said cylinder pistons, a fluid pressure pipe leading from said auxiliary valve to said cylinders and having a branch connection with said brake cylinder pipe, and means actuated by the movement of said controlling valve lever when it is thrown to a predetermined point for opening said auxiliary valve and admitting fluid pressure to said cylinders and to said brake cylinder pipe simultaneously.

20. The combination, with a truck frame, of a fluid pressure reservoir mounted thereon, a fluid pressure controlling valve having a pipe connection with said reservoir and provided with an exhaust, a brake cylinder pipe also communicating with said controlling valve, an operating lever for said valve, fluid pressure cylinders supported on said truck frame, pistons therefor, a fender arranged to be raised or lowered by the movement of said cylinder pistons, a fluid pressure pipe leading to said cylinders and connected with said brake cylinder pipe, and mechanism actuated by the movement of said controlling valve lever, when thrown to a predetermined point, for admitting fluid pressure to said fender cylinders and to said brake cylinder pipe simultaneously.

21. The combination, with a truck frame, of a fluid pressure reservoir mounted thereon, a fluid pressure controlling valve having a pipe connection with said reservoir, an operating lever for said valve, an auxiliary valve communicating with said fluid pressure pipe, a fluid pressure cylinder, a piston therefor, a fender arranged to be actuated by the movement of said cylinder piston, a fluid pressure pipe leading from said auxiliary valve to said fender cylinder, and means actuated by the movement of said controlling valve lever for opening said auxiliary valve and admitting fluid pressure to said fender cylinder.

22. The combination, with a truck frame, of a fluid pressure reservoir mounted thereon, a fluid pressure controlling valve having an operating lever and a pipe connection with said reservoir, a brake cylinder pipe also communicating with said valve, a fluid pressure cylinder and a piston therefor, a fender arranged to be raised or lowered by the movement of said piston, a fluid pressure pipe leading to said fender cylinder and having a branch connection with said brake cylinder pipe, and means actuated by the movement of said controlling valve for admitting fluid pressure to said fender cylinder and to said brake cylinder pipe simultaneously.

23. The combination, with a truck frame, of a fluid pressure reservoir mounted thereon, a fluid pressure controlling valve having a pipe connection with said reservoir and provided with an exhaust, fluid pressure cylinders vertically arranged on the forward portion of said truck frame, pistons therefor, a fender carried by said pistons, a flexible pipe detachably connected to the upper portions of said fender cylinders and connected with the pipe connection of said fluid pressure reservoir, and mechanism actuated by the movement of said controlling valve for admitting fluid pressure to said flexible pipe and said fender cylinders simultaneously.

24. The combination, with a truck frame, of a vertically movable cylinder mounted thereon and a piston for said cylinder, a fender carried by said piston, and means for admitting fluid pressure to said cylinder to depress said piston and fender.

In witness whereof, we have hereunto set our hands this 13" day of June 1911.

FRANK A. NELSON.
HARRY E. GILHAM.

Witnesses:
GENEVIEVE E. SORENSEN,
EDWARD A. PAUL.

Copies of this patent may be obtained for five cents each, by addressing the "Commissioner of Patents, Washington, D. C."